United States Patent
Vasiliev et al.

[11] 3,901,072
[45] Aug. 26, 1975

[54] METHOD OF TESTING DAMPING PROPERTIES OF LIQUID DAMPER

[76] Inventors: July Arsenievich Vasiliev, ulitsa Babushkina 22, kv. 28; Mikhail Petrovich Orfani, ulitsa Kobozeva 83, kv. 14; Evgeny Vasilievich Markelov, ulitsa Shevchenko, 29, kv. 18; Jury Ivanovich Ivashkin, ulitsa Baumana, 16, kv. 95; Alexandr Petrovich Dyakov, ulitsa Krasnoflotsev, 49, kv. 57; Vladimir Ivanovich Kljukin, ulitsa Pionerov, 10, kv. 12, all of Sverdlovsk, U.S.S.R.

[22] Filed: May 2, 1973

[21] Appl. No.: 356,597

[52] U.S. Cl. ............................. 73/70.1; 73/1 DV
[51] Int. Cl. ................................................ G01h 1/10
[58] Field of Search ............ 73/70.1, 67.2, 67.3, 99, 73/1 R, 1 B, 1 C, 1 DV

[56] References Cited
UNITED STATES PATENTS

| | | | |
|---|---|---|---|
| 3,054,284 | 9/1962 | Ciringione et al. | 73/70.1 X |
| 3,693,402 | 9/1972 | Jones | 73/70.1 X |

*Primary Examiner*—Jerry W. Myracle
*Assistant Examiner*—Stephen A. Kreitman
*Attorney, Agent, or Firm*—Waters, Schwartz & Nissen

[57] ABSTRACT

A method of testing the damping properties of a liquid damper which consists in that the damper is being rotated at a maximum frequency on a torsional vibration machine for taking measurements of the amplitude of vibrations at this frequency of one element of the torsional vibration machine which is to be followed by making a comparison between the measured amplitude and the permissible limits of its variation.

1 Claim, 2 Drawing Figures

METHOD OF TESTING DAMPING PROPERTIES OF LIQUID DAMPER

The invention relates to methods of testing dampers of torsional vibrations and, more particularly, to methods of testing the damping properties of the liquid dampers which can be used for final testing of the newly produced dampers and for determination the technical condition of dampers that were in service for a long time.

The known method of testing the damping properties of liquid dampers carried out on a special torsional vibration machine (T.V.M.) by means of imparting vibrations to the damper consists in the following.

For testing dampers of certain types and dimensions, it is necessary to select the parameters of the T.V.M., i.e. the inertia moments of masses and the yieldability of the torsion bar, so that an optimal damping value is obtained in the torsional system of the machine with the tested damper which has a rated damping coefficient. In this case, as it is known, the maximum amplitude of vibrations coincides with the invariant amplitude. The testing of the damping properties of dampers in this case is conducted as follows.

The damper under test is heated up to a required temperature. Then it is mounted on the machine and rotated until its temperature falls to a strictly determined value. At this temperature of the damper, measurements of the vibration amplitudes of one of the elements of the T.V.M. are taken at various frequencies of the disturbing moment produced by the exciter.

Then the damper is cooled again to a certain temperature and once more measurements of the vibration amplitudes of the same element of the T.V.M. are taken within the necessary range of the vibration frequencies.

Based on the results of both measurements, it is necessary to plot curves showing the relationship between the amplitude A of vibrations of the T.V.M. element and the frequency W of vibrations, to obtain the invariant frequency which corresponds to the point of intersection of the curves.

If the curve $A=f(W)$ for the hot damper has got the maximum value at the point of intersection of the curves, then, consequently the damper under test has a rated (estimated) damping coefficient. However, due to inevitable fluctuations in the sizes of damper components from the rated values, as well as variation in the viscosity of the silicon liquid, its damping coefficient will differ from the rated one, and the maximum of the curve $A=f(W)$ for the hot damper will not coincide with the invariant frequency. In this case, if the frequency which corresponds to the maximum amplitude of vibrations and which is taken as the tested parameter is within the permissible limits determined by calculation from the allowable values of the damping coefficient, the damper under test is approved of as a suitable one.

The known method of testing the damping properties of a liquid damper is disadvantages in that it involves labour intensive operations required for heating the damper and cooling it by stages, making temperature checks, taking a large number of measurements, plotting curves. Besides, the present method involves re-adjustment of the T.V.M. for testing dampers of different types and dimensions.

The object of the invention is to provide a method of testing the damping properties of liquid dampers, being less labour-consuming and simpler, enabling a low-skilled workman to perform the testing operation and making it possible to test dampers of different types and dimensions without readjusting the T.V.M. and being, at the same time, highly reliable.

This object is accomplished in a method of testing the damping properties of liquid dampers wherein, according to the invention, the dampers are oscillated at a maximum frequency at which the vibration amplitude of one of the elements of the T.V.M. is measured, and the obtained value is taken as the testing parameter comparing the latter with the permissible limits of variation.

The advantages of the method of testing the damping properties of a liquid damper constructed according to the invention consist in that there is no need of heating the damper and cooling it by stages, checking its temperature, taking a large number of measurements and plotting curves. Besides, the method makes it possible to test dampers of several types and dimensions without re-adjusting the T.V.M.

The invention is further illustrated by the description of a specific embodiment with reference to the accompanying drawings wherein.

Figure 1:
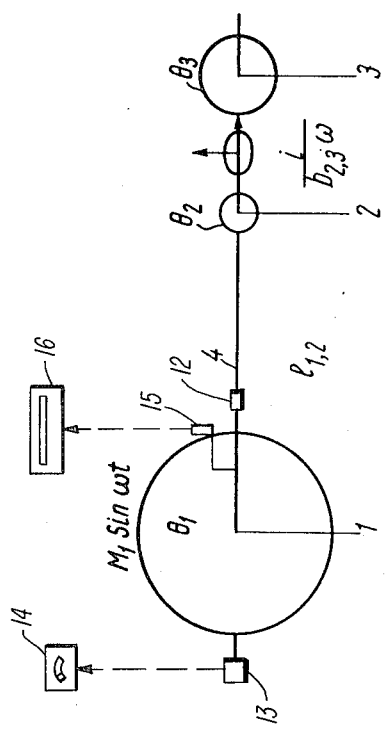
FIG. 1 represents a layout of the torsional vibration system of the T.V.M.

The layout of the torsional vibration system of the machine for testing the damping properties of liquid dampers shown in FIG. 1 is a single-mass system consisting of an exciter 1 having a moment of inertia $\theta_1$ wherein the periodical disturbing moment $M=M_1 \sin Wt$ is excited.

The damper under test comprising a housing 2 with a moment of inertia $\theta_2$ and a flywheel 3 with a moment of inertia $\theta_3$ is connected to the exciter 1 by means of an elastic torsion bar 4 having a yieldability $e_{1,2}$.

Glued to the torsion bar 4 are suitable strain gauges or sensing elements 12 whose signals are transmitted, through a current collector 13, to an instrument 14 which records the value of the strain in the torsion bar 4.

The frequency of vibrations (or the number of revolutions of the torsion bar 4) is measured by means of a detector 15 and a frequency meter 16.

Figure 2:
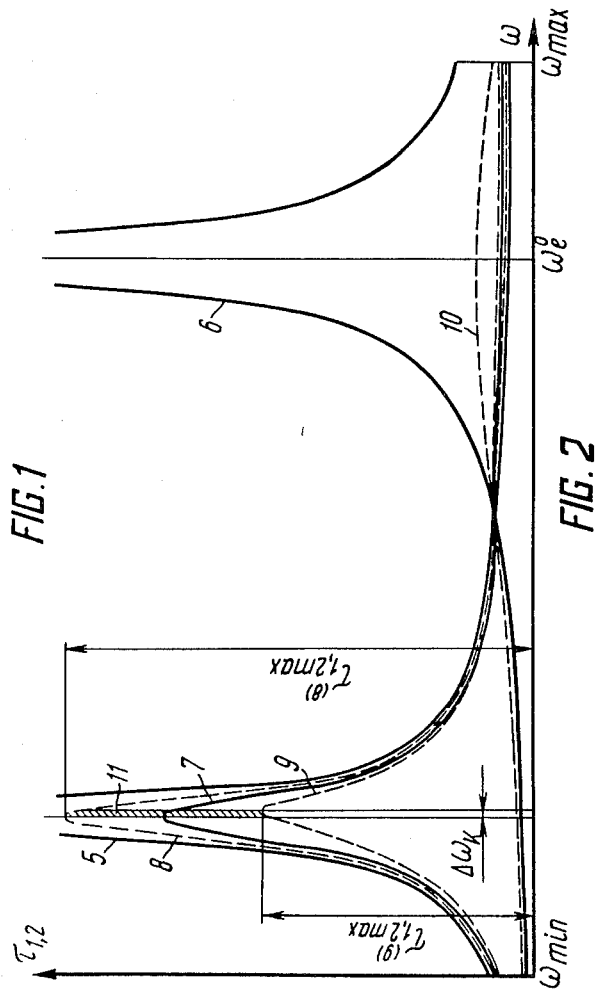
FIG. 2 represents a variation in the amplitudes of stresses $\tau_{1,2}$ in the torsion bar depending on the frequency W at various values of the damping coefficient $b_{2,3}$.

FIG. 2 shows the variation of the amplitude of stresses $\tau_{1,2}$ in the torsion bar 4 depending on the frequency W of vibrations at various values of the damping coefficient $b_{2,3}$ of the liquid damper for the torsional vibration system of the machine shown in FIG. 1. The curve 5 is represented in this case by $b_{2,3}=\infty$; the curve 6 — by the value of $b_{2,3}=0$; the curve 7 — by the value of $b_{2,3}$ = rated value; the curve 8 — by the value of $b_{2,3}$ > rated value; the curve 9 — by the value of $b_{2,3}$ < rated value; the curve 10 — by the value of $b_{2,3}$ << rated value. And, finally, the shaded portion II is the area of variation in the maximum amplitudes of stresses in the torsion bar while changing the value of the damping coefficient $b_{2,3}$ within certain limits.

The essence of the present method consists in the following.

If the damper under test is not optimal for the torsional vibration system of the machine, then even an insignificant diversion of the damping coefficient value of the damper from the rated value will cause such a considerable change of the maximum amplitude of stresses in the torsion bar 4 that the change can easily be detected by means of conventional measurement methods employed in investigating torsional vibrations.

For this purpose, the limit curves of the variation in amplitudes of stresses in the torsion bar 4 (for example, the curves 8 (FIG. 2) and 9) are calculated or determined experimentally on the basis of the known permissible limits of variation of the damping coefficient $(b_{2,3})$max. and $(b_{2,3})$min. Making use of these curves, it is possible to determine the range of frequencies $\Delta Wk$ within which the amplitudes of stresses in the torsion bar 4 reach the highest value while changing the coefficient $b_{2,3}$ within allowable limits. The limits of variation in maximum amplitudes of stresses in the torsion bar 4

$$(\tau_{1,2})\text{max} = \tau_{1,2} \overset{(8)}{\text{max}} \quad \text{and} \quad (\tau_{1,2})\text{min.} = \tau_{1,2} \overset{(9)}{\text{max.}}$$

are also determined establishing thereby the allowable portion II of variation in maximum amplitudes of stresses.

Both the theory, and the experiment show that while changing the coefficient $b_{2,3}$ within permissible limits, the frequency of maximum vibrations changes rather insignificantly resulting in a very narrow range of frequencies $\Delta Wk$.

Then by using the obtained values of the $\Delta Wk$ $(\tau_{1,2})$ max. and $(\tau_{1,2})$min, marks are inscribed on the appropriate instruments limiting the zones of the tested range of frequencies and stresses. Inscribing marks on the frequency meter 16 (or tachometer when the frequency of the disturbing moment is proportional to the number of rotations of the torsion bar) is an easy matter. Whereas, the inscription of marks on the instrument 14 registering the value of stresses in the torsion bar is performed by loading the torsion bar with a static torque.

After this the process of testing the damping properties of liquid dampers is performed rather simply. The damper to be tested is mounted on the machine and is run in for several minutes required for the liquid to fill in the working clearances between the housing 2 and the flywheel 3. Then an operational mode which ensures a maximum value of the amplitude of stresses (frequency of maximum variations) in the torsion bar 4 is established within the range of frequencies $\Delta Wk$.

The amplitude selected as a testing parameter can be observed on the instrument 14 which registers the value of stresses in the torsion bar 4. If the value of this amplitude is within the permissible limits $(\tau_{1,2})$min $<\tau_{1,2}$max $<<(\tau_{1,2})$max., i.e. if the instrument reading is within the marked zone, the damper is specified as valid.

If the amplitudes of stresses in the torsion bar 4 are comprised outside the marked zone in the range of frequencies $\Delta Wk$, it is advisable to determine the frequency of the maximum vibrations and the value of the maximum amplitude of stresses within the range of the frequencies Wmin. to Wmax.

Using these data, it is possible to determine rather precisely what kind of defect the damper under test has. For example, the damper characterized by the curve 10 is either partially filled with liquid, or is filled with a liquid of much lower viscosity.

With the method of testing the properties of liquid dampers, according to the invention, the values of the inertia moment $0_1$ of the exciter 1 are, in principle, not limited by anything. The yieldability $e_{1,2}$ of the torsion bar 4 calculated from the maximum allowable (for example, by the level of noise) frequency of vibrations Wmax. This frequency may be larger or smaller than the frequency $W_e^o$ of resonance vibrations at $b_{2,3}=0$, and it is set, proceeding from specific problems.

It follows from the above-mentioned that, firstly, the determination of the parameters of the torsional vibration system of the machine employed in the present method of testing the damping properties of the liquid dampers does not present any difficulties and is essentially simpler than with the known method of control, and, secondly, it is possible to test dampers of several types and dimensions on one machine without introducing any changes to the torsional vibration system of the machine, if the amplitude of stresses in the torsion bar does not exceed the permissible value.

If it is necessary to test dampers differing essentially by their dimensions on the T.V.M., it will suffice to change one torsion bar 4. An easy procedure for effecting such a change is not difficult to provide while designing the machine.

What is claimed is:

1. A method of testing the damping properties of a liquid damper consisting of determining the frequency of maximum vibrations on the basis of predetermined results; rotating a torsional vibrations machine with a damper at the said frequency of maximum vibrations; measuring the amplitude of maximum vibrations of an element of the said torsional vibrations machine, and making a comparison between the measured amplitude and the permissible limits of variations in amplitude.

* * * * *